H. Fassmann.
Cotton Bale Tie.

Nº 62,188.   Patented Feb. 19, 1867.

Witnesses:
Theo. Fusche
Wm. Trewin

Inventor:
H. Fassman
Per Munn & Co.
Attorneys

United States Patent Office.

H. FASSMANN, OF NEW ORLEANS, LOUISIANA.

Letters Patent No. 62,188, dated February 19, 1867.

IMPROVEMENT IN COTTON-BALE TIE.

The Schedule referred to in these Letters Patent and making part of the same.

TO ALL WHOM IT MAY CONCERN:

Be it known that I, H. FASSMANN, of New Orleans, in the parish of Orleans, and State of Louisiana, have invented a new and improved Buckle-Fastening or Hoop-Lock for Bales; and I do hereby declare that the following is a full, clear, and exact description thereof, which will enable others skilled in the art to make and use the same, reference being had to the accompanying drawings, forming part of this specification.

This invention relates to a new and improved buckle or fastening for the iron hoops used on bales, designed more especially for cotton bales.

The invention consists in having a metal plate, of wrought, cast, or malleable cast iron, with two slots in it, one having smooth sides, and through which one end of the hoop passes and is prevented from slipping by the serrated or toothed sides. In the accompanying sheet of drawings—

Figure 1:
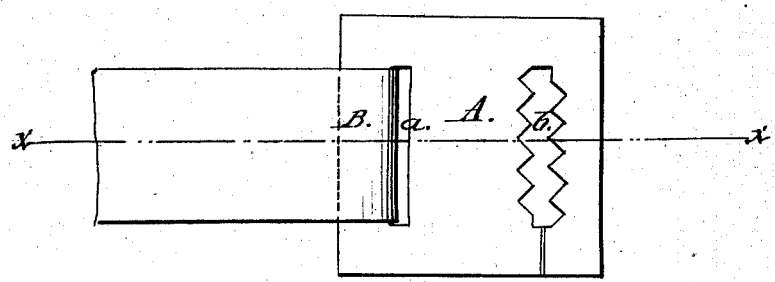

Figure 1 is a face view of my invention, having one end of a metal hoop secured in it.

Figure 2:
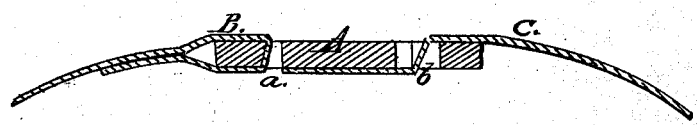

Figure 2, a section of the same taken in the line $x$ $x$, fig. 1, and having both ends of the hoop secured in it.

Similar letters of reference indicate like parts.

A represents a plate which may be of wrought, cast, or malleable cast iron, of square or an approximate form, and a trifle wider than the hoop, the ends of which it connects or secures. This plate A has two slots or openings, $a$ $b$, in it, one of which, $a$, has smooth sides, and one end, B, of the hoop, is passed through it and secured through by being bent so as to form a loop, $c$, as shown clearly in fig. 1. The other slot or opening, $b$, has serrated or toothed sides, as shown clearly in fig. 1; and when the bale is fully compressed and the hoops adjusted around it, the other ends, C, of the hoops (see fig. 2) are passed through $b$ from the outer side of the plate; and when the bale is relieved of pressure and expands to a certain degree the ends C are bent or clamped tightly in $b$, the serrated toothed sides effectually preventing the ends C from slipping out from $b$. If desired, the plate A may have lateral slots in it, in line with the openings $a$ $b$, to admit of the ready insertion of the ends of the hoops in the slots or openings $a$ $b$.

Having thus described my invention, I claim as new, and desire to secure by Letters Patent—

The plate A, having a slot or opening, $b$, provided with serrated or toothed sides to receive the end C of the hoop and prevent the slipping or withdrawing of C from $b$, substantially as shown and described.

The above specification of my invention signed by me this 26th day of December, 1866.

H. FASSMANN.

Witnesses:
C. CHAMBERS,
W. B. PHILLIPS.